United States Patent [19]

Klennert

[11] 4,168,726

[45] Sep. 25, 1979

[54] THERMAL BOOT APPARATUS

[75] Inventor: William R. Klennert, New Palestine, Ind.

[73] Assignee: Scott Insulation Company Inc., Indianapolis, Ind.

[21] Appl. No.: 800,323

[22] Filed: May 25, 1977

[51] Int. Cl.² .................. B65D 65/08; B65D 59/08
[52] U.S. Cl. ............................. 138/96 R; 138/89;
  138/178; 98/122; 55/385 F
[58] Field of Search ............... 138/96 R, 96 T, 110,
  138/89, 178; 139/389; 98/122; 150/2.1, 2.2, 52
  R; 220/9 R, 9 D, 9 M, 10; 428/35, 256, 500;
  55/101, 270, 385 F

[56] References Cited
U.S. PATENT DOCUMENTS

| | | |
|---|---|---|
| 1,818,345 | 8/1931 | Moltweiler et al. ............ 428/256 X |
| 2,942,625 | 6/1960 | Costonzo .......................... 138/96 R |
| 3,085,612 | 4/1963 | Gobel ................................. 150/52 R |
| 3,350,823 | 11/1967 | Murray ......................... 150/52 R X |
| 3,413,180 | 11/1968 | Smith ............................... 428/256 X |
| 3,589,971 | 6/1971 | Reed ............................. 150/52 R X |
| 3,906,129 | 9/1975 | Damois ........................... 150/2.2 X |

FOREIGN PATENT DOCUMENTS 1952490 4/1970 Fed. Rep. of Germany ........ 138/96 R
757447 9/1956 United Kingdom ...................... 138/96

Primary Examiner—Richard E. Aegerter
Assistant Examiner—James E. Bryant, III
Attorney, Agent, or Firm—Woodard, Weikart, Emhardt & Naughton

[57] ABSTRACT

A thermal boot apparatus for enclosing a test port and cap for a power house precipitator comprising an inner and an outer stainless steel mesh sleeve each having one end enclosed, a layer of insulating material sandwiched between the inner and outer sleeves, and a mastic coating on the outer surface of the outer sleeve and end. Also included is the combination of a test port for a power house precipitator, a removable cap on the end of the test port and the thermal boot apparatus with a stainless steel band including a sealing clip encircling the coated outer sleeve to secure the thermal boot over the test port and cap.

4 Claims, 2 Drawing Figures

THERMAL BOOT APPARATUS

BACKGROUND OF THE INVENTION

1. Field of the Invention

The present invention relates to devices used to enclose the capped test ports on a power house precipitator.

2. Description of the Prior Art

As a general background, all boilers and other types of power house precipitators include at least one stack or test port through which to inspect the condition of the precipitator. Substantial amounts of moisture and fly ash circulate inside such precipitators and solidify on the inside walls of the test ports. The buildup of this ash is often so great that it is almost impossible to remove from the surface of the inside walls of the ports.

The Environmental Protection Agency (hereinafter referred to as EPA) presently requires that an inspection be made of these test ports every six months. To facilitate this inspection, it is necessary to install some kind of removable cover over the projecting collar or end of these test ports. It is the present state of the art to place a removable metal cover or cap over the test port opening between the six-month inspections. This cap may be secured to the end of the port by any number of conventional means, such as by threading the port and cap or by plugging the cap into an appropriately sized pipe coupling.

However, such metal coverings cause much problem because the buildup of fly ash often "cements" the cover to the test port thereby making it impossible to remove the cover from the opening in order to conduct the inspection. It is believed that this "cementing" action results at least in part from the temperature difference between the hot ash and water vapor circulating inside the port and the much cooler outside air. This gradient causes the ash to solidify on the inside wall of the port and almost weld the cap in place. It is not unusual in such situations to require a blow torch to remove the "cemented" cover.

SUMMARY OF THE INVENTION

One embodiment of the present invention comprises a thermal boot apparatus for enclosing a port including an inner mesh sleeve having one closed end and defining a compartment adapted to fit over the neck of a port, an outer mesh sleeve having one closed end with the inner sleeve positioned inside the outer sleeve, a layer of insulating material positioned between the inner and outer sleeves and between the ends thereof and a mastic coating covering the entire outer surface of the outer sleeve and end.

One use of the above embodiment, as further described herein, alleviates the problems presently encountered with test port inspections by covering both the port and metal cap with a thermal boot. The boot is flexible, very durable and weatherproof, and provides a well-insulated cover which prevents the cap from being "cemented" to the port and can be easily removed and replaced to permit the periodic inspections.

One object of the present invention is to provide an improved covering for enclosing ports.

Another object of the present invention is to provide a covering for such ports which can be easily removed and replaced to permit periodic inspections of the inside of a test port on a power house precipitator.

Another object of the present invention is to provide a covering that is durable enough to withstand all weather conditions while also being flexible enough to allow easy removal.

Related objects and advantages of the present invention will be apparent from the following description.

DESCRIPTION OF THE PREFERRED EMBODIMENT

Figure 1:
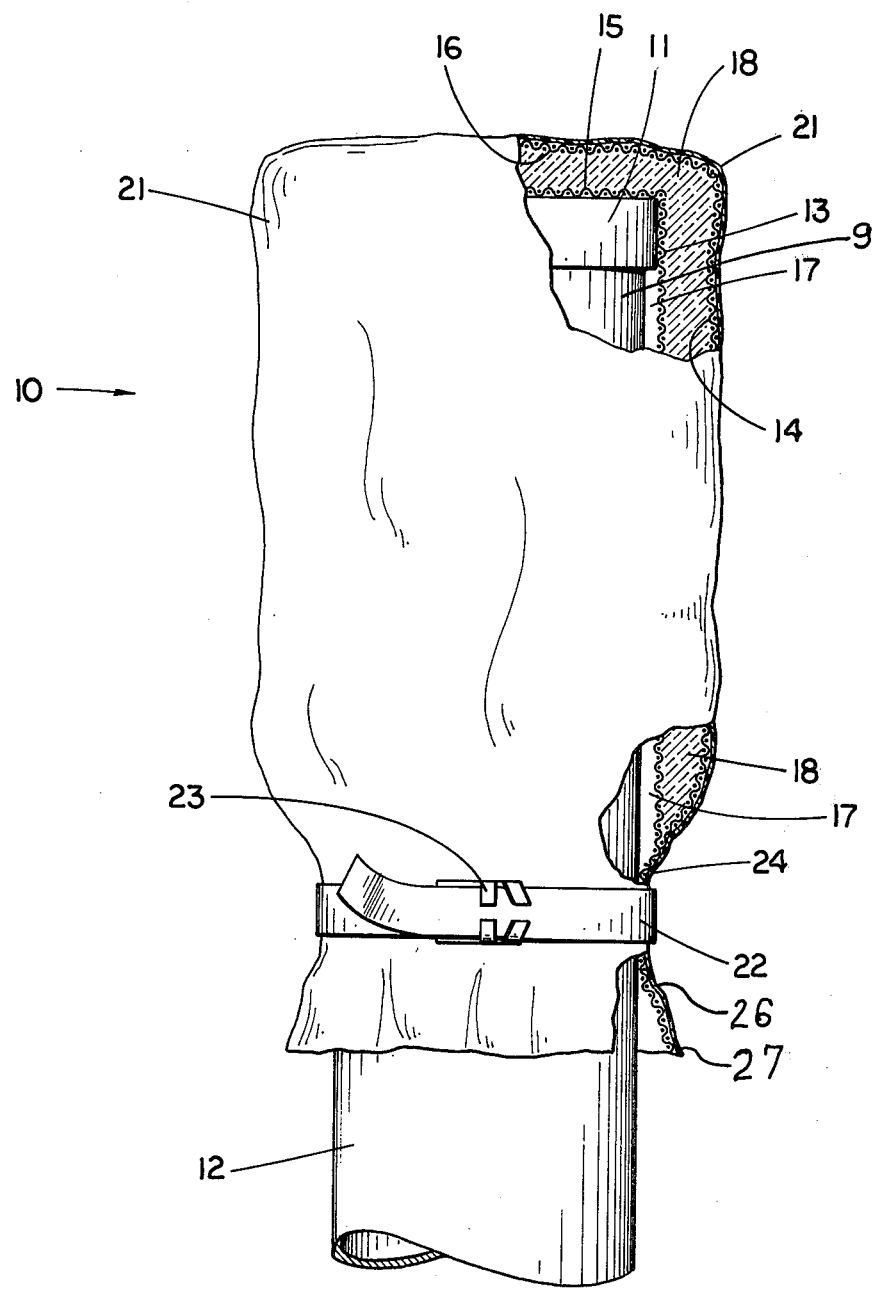
FIG. 1 is a side elevation partially in section of the thermal boot apparatus comprising the preferred embodiment of the present invention enclosing a test port and cap for a power house precipitator.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 2:
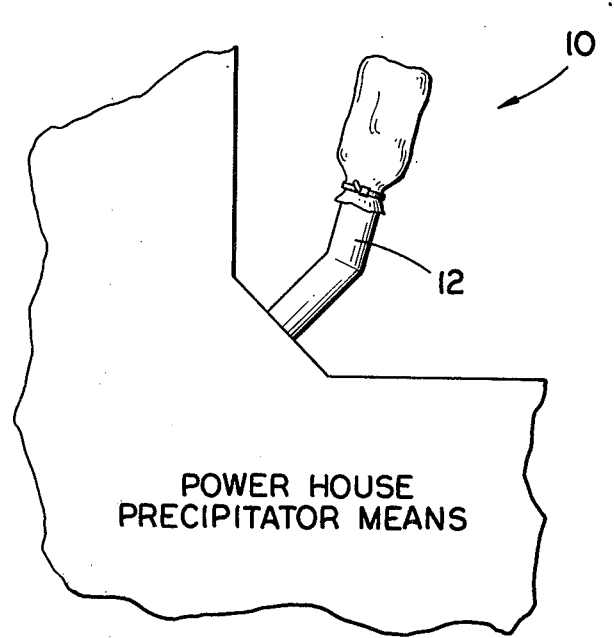
FIG. 2 is a side elevation of the preferred thermal boot apparatus in FIG. 1 mounted to and enclosing a test port on a power house precipitator means.

Referring now to FIG. 1, the thermal boot apparatus 10 comprising the preferred embodiment of the present invention is therein depicted. The boot 10 has been mounted over the removable cap 11 on the neck 9 of a typical test port 12 for any variety of power house precipitator means. FIG. 2 depicts this same preferred boot 10 mounted to a test port 12, the test port being attached to a representation of a typical powerhouse precipitator means to permit sampling of the atmosphere therein.

Specifically, the thermal boot 10 is composed of an inner and an outer mesh sleeve 13 and 14, each having one closed end 15 and 16, respectively. The inner sleeve 13 is positioned inside outer sleeve 14 and defines a compartment 17. Various kinds of mesh material may be used to construct sleeves 13 and 14 and their ends 15 and 16, the major concerns being the formability of the specific material, its durability under the extreme heat and possible harsh atmosphere near the test port opening, and its removability from the test port and cap. In the preferred embodiment, the sleeves and ends were made of a stainless steel mesh material.

The exact dimensions of a given thermal boot apparatus 10 of the present invention may vary greatly, depending on the dimensions of the specific test port and cap. The only dimensional restraint is that the compartment 17 must be sufficiently large to fit over the cap and neck of the specific test port. In practice, the internal diameter of compartment 17 might have a dimension of, for example, 4.5 inches, although this dimension can again vary depending on the size of the test port neck and cap.

A layer of insulating material 18 is positioned between the inner and outer sleeves and the ends thereof. This insulation protects both the test port neck 9 and cap 11 from outside conditions while the cap 11 still prevents the escape of any fly ash or other pollutants from the test port. Although various kinds of insulating material may be used, boot 10 of the preferred embodiment includes a glass fiber insulating blanket about at least one inch in thickness and suitable for temperatures of about at least 1200° F.

Once the sleeve and insulation arrangement is completed, a mastic coating 21 is applied to the entire outer surface of the outer sleeve and end. The purpose of this coating is to weatherproof the thermal boot apparatus while also providing a durable, flexible covering that will withstand harsh treatment both in storage and when used to enclose a test port and cap. Various types of mastic coatings may be used with the present invention; however, the thermal boot apparatus comprising the preferred embodiment incorporates a vinyl acrylic mastic coating.

It is also desirable to provide some means for securing the thermal boot 10 over the test port for the power house precipitator. In the preferred embodiment, a stainless steel band 22 including a sealing clip 23 encircles the outer surface of the boot near its open end. This band and clip may be used to pull the uninsulated boot wall 24 tightly against the outer surface of test port 12 thereby securing the boot over the test port opening.

The construction of the thermal boot apparatus 10 comprising the preferred embodiment of the present invention is very simple. First, the inner sleeve 13 is constructed by taking a piece of flat knitted stainless steel mesh material cut to the desired length, stretching it around a metal form of the appropriate diameter and stapling along the seam. A circle of the mesh material is then cut to the proper diameter and stapled in a circular seam to one end of the sleeve to form the closed end 15.

Second, the outer sleeve 14 is made in the same manner except that it is formed about two inches larger in diameter to permit insertion of the insulating layer. The outer sleeve is also turned inside out after it is completed so that the seams are directed inwardly. This is unlike the inner sleeve which is assembled into the boot with its seams directed outwardly.

Third, the one inch thick glass fiber insulating layer 18 is positioned between the inner and outer sleeves. A circle of insulation the same diameter as the closed end of the outer sleeve is pushed flat against the inside of the closed end of this sleeve. A rectangle of insulation cut to equal the inner circumference of the outer sleeve is then inserted into the outer sleeve and pushed tightly against the closed end and sides of this sleeve. The length of this rectangle is such that a portion 26 of each sleeve opposite its closed end is not insulated. The inner sleeve is now inserted and pushed tightly against the insulating layer. The remaining uninsulated mesh from both the inner and outer sleeves is then turned in and stapled to form a hem 27 in order to eliminate any rough edges on the open end of the boot.

Fourth, the entire outer surface of the boot is treated with two coats of vinyl acrylic mastic 21, each coat being given about 24 hours to completely dry.

Fifth, the stainless steel band 22 which may be about ¾ of an inch wide including a sealing clip is placed around the open end or cuff of the thermal boot and may, if desired, be held in place by two pieces of stainless steel wire (not shown). This band can be drawn tight to secure the boot to the test port and then easily loosened at a later time to allow removal.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:
1. The combination comprising:
 (a) power house precipitator means including a test port;
 (b) a removable cap on the end of said test port; and
 (c) a thermal boot apparatus enclosing said test port and said cap, said thermal boot apparatus including:
  (i) an inner mesh sleeve of stainless steel having one closed end and defining a compartment adapted to fit over the neck of a test port;
  (ii) an outer mesh sleeve of stainless steel having one closed end, said inner sleeve being positioned inside said outer sleeve;
  (iii) a layer of insulating material positioned between said inner and said outer sleeves and between the ends thereof; and
  (iiii) a mastic coating on the outer surface of said outer sleeve and end.

2. The combination of claim 1 wherein said mastic coating is composed of vinyl acrylic mastic.

3. The combination of claim 1 additionally comprising means, including a stainless steel adjustable band with a sealing clip encircling said coated outer sleeve opposite the closed end thereof, for securing said thermal boot apparatus to said test port.

4. The combination of claim 3 wherein said layer of insulating material is a glass fiber blanket about at least one inch thick and suitable for temperatures of about at least 1200° F.

* * * * *